Sept. 13, 1949.  W. H. UNGER  2,482,081
ELECTROSTATIC PICKUP
Filed Dec. 19, 1944
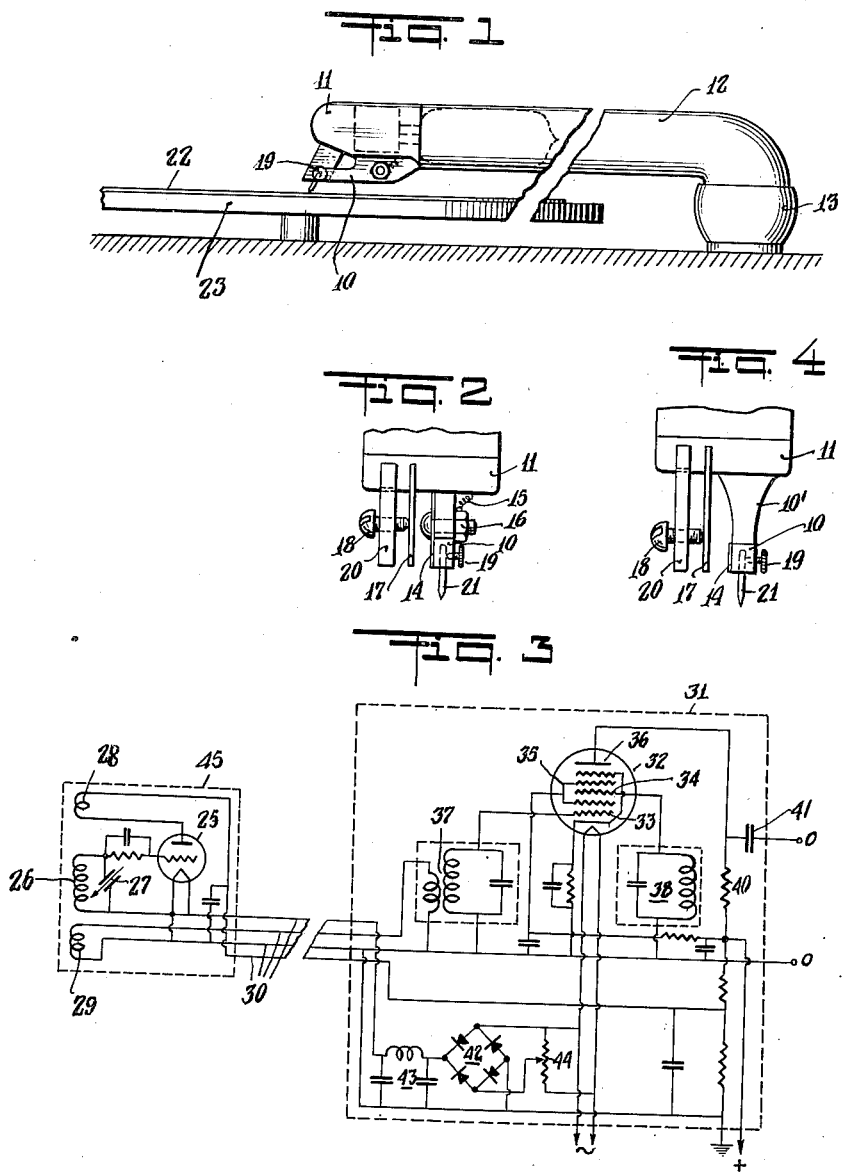
INVENTOR.
William H. Unger
BY
ATTORNEY Patented Sept. 13, 1949

2,482,081

UNITED STATES PATENT OFFICE 2,482,081

ELECTROSTATIC PICKUP

William H. Unger, New York, N. Y.

Application December 19, 1944, Serial No. 568,878

5 Claims. (Cl. 179—100.41)

This application is a continuation-in-part of application Serial No. 390,906, filed April 29, 1941, entitled "Electric translating system," now Patent No. 2,368,052 issued January 23, 1945.

The present invention relates to phonograph pick-ups, more particularly to electrostatic pickups for use in connection with a source of high frequency current to translate the sound or other records of a phonograph disk or the like into corresponding electrical variations.

An object of the invention is to provide a simple and highly efficient electrostatic pick-up system for faithfully reproducing phonographic sound records.

Additional objects and aspects of the invention will become more apparent from the following detailed description taken with reference to the accompanying drawings forming part of this specification and wherein:

Figure 1 illustrates schematically a tone arm and electrostatic pick-up device for reproducing sound records according to the invention;

Figure 2 is an enlarged front view of the pickup head shown in Figure 1;

Figure 3 is a complete circuit diagram of an electrical reproducing system embodying an electrostatic pick-up device according to the invention; and Figure 4 is a front view of a modified pick-up according to the invention.

In a vibrating system wherein the velocity of the vibratory element varies inversely as the frequency is increased for a constant driving force, the system is said to be "mass controlled." Similarly, if the vibratory element has a velocity which is independent of the frequency but dependent only upon the force causing the vibration, the system is referred to as "resistance controlled," and finally, if the maximum deflection of the vibratory element from the normal or mean position is proportional to the amplitude of the force causing the vibration then the system is said to be "stiffness controlled."

A "mass controlled" system is expressed by Newton's law of motion according to the following equation:

$$F = ma \qquad (1)$$

wherein F is the force acting on the system at any moment, $m$ is the mass of the system, and $a$ represents the acceleration at the instant under consideration.

Similarly a "resistance controlled" system is expressed by the following equation:

$$F = k_1 v \qquad (2)$$

wherein F is again the force, $k_1$ is a constant of proportionality and $v$ is the velocity at the instant under consideration.

Finally, a "stiffness controlled" system is expressed by the following equation:

$$F = k_2 x \qquad (3)$$

wherein F is again the force, $k_2$ a constant of proportionality and $x$ the distance that the element has moved from the normal or mean position at the instant under consideration. This latter equation corresponds to Hooke's law of springs which says that the force tending to restore a spring to its original shape is proportional to the amount that the spring has been stretched.

In any normal vibratory system the above three terms have to be applied simultaneously although one or more may be small in magnitude relative to the others and may be neglected in a first approximation. Thus, the total force acting on a system is balanced by the three effects stated above which add up to give an equal and opposite reaction on the force causing the motion in accordance with the resultant equation as follows.

$$F = ma + k_1 v + k_2 x \qquad (4)$$

This equation can also be written as follows:

$$F = m\frac{d^2x}{dt^2} + k_1 \frac{dx}{dt} + k_2 x \qquad (5)$$

wherein $$\frac{d^2x}{dt^2}$$

being the second derivative of the distance moved with respect to time represents the acceleration and $$\frac{dx}{dt}$$

is the rate of change of distance or instantaneous velocity.

Considering the ordinary phonograph pick-up in which the grooves in a record cause the stylus or needle to vibrate and in turn to transmit the vibrations to some elements, usually a crystal or coil serving to convert the vibrations of the mechanical system into corresponding electrical changes, it is seen that the system can be analyzed on the basis of the equation given above if there is substituted for $m$ in all the equations a term representing the moment of inertia of the system with respect to its vibrating axis rather than the actual mass of the vibrational elements. At low frequencies the first two terms on the right-hand side of Equation 5 can be neglected, at least in comparison with the magnitude of the third term and accordingly the system will be stiffness controlled. At very high frequencies the system becomes mass controlled since the velocity and deflection will be very small in comparison to the maximum acceleration so that the first term on the right-hand side of Equation 5 will become most important. Over a certain range of medium frequencies the second derivative term will cancel out the term containing only $x$ and the middle term on the right-hand side of Equation 5 will be most important and accordingly the system will be resistance controlled.

In ordinary practice the response of the pick-up and its action on the record are most likely to be unsatisfactory at the high end of the audio spectrum. If the force required to drive the needle is very high, the needle may not follow the exact shape of the groove and distortion will result and the higher frequency may be worn off the record. It is obvious, therefore, that it is desirable to make the vibrating system stiffness or resistance controlled up to as high a frequency as possible. In the recording of voice and music most of the energy in sound is contained in the frequency range of about 250 to 2500 cycles per second, although there may be instantaneous peaks at lower frequencies of very high energy content. Above 2500 cycles the energy falls off quite rapidly, although these frequencies are essential to the faithful reproduction of speech and music. If the mechanical side of the pick-up system can be made such that the change or transition to mass control takes place above 2500 cycles, then the force required for a given output will not become excessively higher than the force required for the same output at medium frequencies, until a frequency of say 7500 to 10,000 cycles is reached. At these frequencies the energies will be so small that the forces cannot become too great in any event.

Referring to Figures 1 and 2, there is shown schematically an improved electrostatic pick-up system designed in accordance with the foregoing considerations. The vibrating element takes the simple form of a plate or bar 10 of plastic or any other suitable elastic material such as Celluloid, cellulose acetate, or even metal integal with or secured to the pick-up head 11 attached to the tone arm 12. The latter is pivoted at 13 in any suitable manner.

The vibrating element if consisting of insulating material has a metallic coating or foil 14 applied to one side thereof in any suitable manner such as a foil of aluminum or any other suitable metal. A wire or lead 15 makes contact to the foil by way of a terminal screw 16 and the foil serves as one electrode of an electrical condenser, the other electrode 17 of the condenser being constituted by a substantially stiff metal plate also secured to the pick-up head 11 and whose spacing relative to the average position of the electrode 14 is made adjustable by the provision of an adjusting screw 18 engaging the threaded bore of a supporting plate 20 secured to the head 11. A needle or stylus 21 provided with a diamond or sapphire point and held by the bar 10 by means of a screw 19 follows the shape of the grooves in the record 22 on turntable 23, thus bending the bar and varying the distance between the metal foil or layer 14 and plate 17, that is varying the capacitance in accordance with the vibrations of the needle 21.

The capacitative pick-up in Figure 1 is shown in approximately natural size and it is found that the capacitance variations obtained are extremely small and of the order of $1/100$ of 1 mmfd. so as to require a highly sensitive and stable converting system to obtain an output voltage or current of sufficient magnitude.

Referring to Figure 3, there is shown a circuit for an electrostatic pick-up according to the invention and embodying a frequency converter or discriminator found to produce satisfactory results in practice. The pick-up capacity serves to frequency modulate a small oscillator which is advantageously mounted directly in the pick-up head and tone arm adjacent to the pick-up condenser such as indicated in dotted lines in Figure 1. This oscillator in the example shown comprises a three-element vacuum tube 25 of the known miniature or bantam type and a grid tank or oscillating circuit comprised of an induction coil 26 shunted by the variable pick-up condenser 27. The plate circuit of the tube is regeneratively coupled with the grid circuit through a feedback or tickler coil 29 to maintain sustained oscillations at a frequency determined by the resonant frequency of the circuit 26—27. Any other type of oscillator circuit may be used for the purpose of the invention as is understood. The oscillations will therefore be frequency modulated in accordance with the variations of the grooves on the record being reproduced.

The frequency modulated oscillations are transmitted by way of coupling coil 29 and connecting wires 30 to a frequency discriminator or converter collectively designated by 31 and being of substantially the type as disclosed in U. S. Patent No. 2,208,091. This discriminator comprises an electron discharge tube 32 including a pair of control electrodes 33 and 34 spaced from each other by a positively biased screen grid 35 and an output electrode or plate 36. The frequency modulated oscillations produced by the pick-up are impressed upon the grid 33 and cathode by way of a resonant input transformer 37 while a further resonant circuit 38 tuned to the average or center frequency of the oscillations generated by the circuit 26—27 in the absence of modulation is connected to the further control grid 34 and cathode. As described in the above mentioned patent, the tuned circuit 38 which is substantially exteriorly decoupled from the remaining parts of the system such as by suitable electromagnetic shielding will be excited by the impressed input potential on the grid 33 by space charge coupling of grid 34 with the electron stream at a varying phase depending on the sense and magnitude of the departure of the impressed frequency from the resonant frequency of circuit 38.

As a result of the dual control of the electron discharge stream by the grids 33 and 34 thus excited by the same frequency but at varying relative phase, the steady or quiescent plate current will include a component varying substantially in proportion to said phase variations or in turn in proportion to the oscillating frequency. This plate current by the provision of a suitable load impedance such as resistor 40 is utilized to develop an output voltage which varies in accordance with the speech or sounds being reproduced and may be further amplified or applied to any output device to be connected to terminals O—O by way of coupling condenser 41.

In case of operation of the circuit from an A. C. source, tube 32 is preferably of the indirectly heated type as shown and a suitable rectifying system 42 and smoothing filter 43 connected to the heating circuit through a potential divider 44 is provided to produce the necessary direct heating current for the oscillator tube 25. The plate supply is preferably provided by a common source such as a battery or rectifier in which case four connecting wires will be required between the oscillator collectively indicated at 45 and the converter 31 in the manner shown. The mounting of the oscillator in the pick-up head and/or tone arm has the advantage of reducing the effect of the stray capacities across the pick-up condenser 27 to a minimum and making the percentage variation in the tuning capacity as high as possible.

According to practical tests made, the resonant frequency of the arm or bar holding the needle was approximately 2000 cycles, that is well above the usual resonant frequencies of ordinary pick-ups. A small amount of damping was used to reduce the resonant peak. This damping may be of the usual damping materials. A vinyl resin used as damping material and applied in various ways was found to give satisfactory results. The amount of damping to be applied is so small that practically any small amount of damping material applied to some part of the bar 10 will very effectively dampen out any small peaks in the resonant characteristic. In practice, the resonant frequency of the vibrating arm could be raised to at least 4000 cycles by the use of suitable materials. The most suitable material can easily be determined by knowing the elastic limit of the material, the modulus of elasticity and its density. The best material would have the highest modulus of elasticity and elastic limit for a given density. For instance, synthetic plastics of the acetate, acrylite, polyamide or the like will give good results for this purpose. However, ordinary Celluloid or resilient metal has been found entirely satisfactory for ordinary use.

If the average gap of the variable pick-up capacity is made very small then the sensitivity will become relatively high but the distortion will be excessive. Using the circuit of Figure 3, the sensitivity can be made comparable to that of ordinary pick-ups, that is the deflection of .001" will give an output of approximately one volt and the second harmonic distortion will be approximately 2% at this output voltage. This is only the distortion inherent in the pick-up that is the distortion in the output voltage assuming a sine wave deflection of the needle point. In practice the needle will not follow the groove shape exactly which is a source of distortion existing in all pick-ups and can only be eliminated by using a groove and needle point of miscroscopic dimensions. The complete oscillator when using a miniature or bantam size tube and variable capacitor assembly can easily be made to fit into a space of 5/8" square and about 1½ to 2" long as indicated in dotted lines in Figure 1. A four wire cable is brought out through the tone arm 12 but since the maximum plate voltage for miniature tubes is 45 volts and the losses in the high frequency lead can be quite high without impairing the operation, the cable can be made quite thin and flexible. It is advisable to provide a by-pass condenser for the plate of the oscillator as large as possible and to mount it in the arm just back of the pick-up head.

The bar or member 10 constitutes an elastic beam secured at one end to a relatively heavy mass represented by the pick-up head 11 and tone arm 12 which may be regarded as stationary as far as the vibrating frequencies of the bar 10 and the stylus 21 are concerned. The free end of the bar 10 is connected to a relatively small mass represented by the needle 21 capable of following the sound vibrations impressed upon the record grooves.

A system of this type may have one or more natural frequencies resulting in a non-linear frequency characteristic of the pick-up and due to discontinuities at the connecting points with the tone arm on the one hand, and the needle on the other hand. This results in energy reflection, especially at the connecting point with the tone arm whereby to produce resonance effects as mentioned above for certain characteristic frequencies or bands of frequencies with consequent distortion of the output energy.

In order to overcome this defect, the cross-section of the arm or bar 10, according to an improved feature of the invention, is so shaped as to provide a gradual impedance matching from the point of the needle mounting to the connecting point with the tone arm. For practical purposes, such a match or prevention of any impedance discontinuities is obtained by a logarithmic cross-section or contour of the bar 10, as shown at 10' in Figure 4. By such a construction the energy transmission from the needle 21 to the arm 10 will be substantially non-resonant or without reflections, whereby to substantially prevent frequency distortion of the output capacity variations to be translated into corresponding amplitude changes of electrical energy. Furthermore, in order to obtain a faithful conversion of the sound vibrations impressed upon the record grooves free from distortions and other disturbances, it is desirable to provide an automatic frequency control for the oscillator to maintain the center or carrier oscillating frequency substantially constant and to compensate for slow frequency drift due to temperature, minute mechanical displacements of the pick-up electrodes and other inferences. Such frequency control or stabilization devices are known in the art of frequency modulated oscillators so that further description thereof will not be necessary. In a simplified arrangement the plate potential of the discriminator 32 varying in accordance with the relative frequency deviation between the oscillator 45 and the tuning frequency of the discriminating circuit 38 may be utilized to supply the plate operating potential for the oscillator 35 through a suitable low pass filter passing only slight variations due to frequency drift and suppressing audio frequencies substantially shown and described in my U. S. Patent No. 2,312,374.

It will be further understood that the invention is not limited to the use of the novel electrostatic pick-up for frequency modulating an auxiliary carrier frequency, but may be embodied in any control circuit of different type such as for producing a phase modulated carrier or may be embodied in the discriminating resonant circuit of the frequency variation response circuit or discriminator as shown and described in the parent application.

While I have shown and described in the foregoing a preferred embodiment of the invention, it is understood that this disclosure is for the purpose of illustration and that various changes in shape, proportion and arrangement of parts, as well as the substitution of equivalent elements and materials for those herein shown and described may be made without departing from the spirit and scope of the invention. The specification and drawing are accordingly to be regarded in an illustrative rather than a restrictive sense.

I claim:

1. An electrostatic reproducer comprising a pick-up head, a vibratory member constituted by a unitary elastic beam of insulating material having one end secured to said head cantilever fashion and adapted to carry a stylus at its free end for cooperation with a record groove, said beam having a substantially smaller mass than said head and said stylus subtending a substantial angle with said beam, a metallic coating applied to a face of said beam forming a first electrode, and a further electrode secured to said head in cooperating and spaced relation to said first electrode, to form a variable condenser therewith.

2. An electrostatic reproducer comprising a pick-up head, a vibratory member constituted by a unitary elastic beam of insulating plastic material having one end secured to said head cantilever fashion and adapted to carry a stylus at its free end for cooperation with a record groove, said beam having a substantially smaller mass than said head and said stylus subtending a substantial angle with said beam, a metallic coating applied to a face of said beam to provide a first electrode, and a metal plate secured to said head in cooperating and spaced relation to said coating to form a variable condenser therewith.

3. An electrostatic reproducer comprising a pick-up head, a vibratory member constituted by a unitary elastic beam of plastic insulating material, said beam having one end secured to said head cantilever fashion and adapted to carry a stylus at its free end for cooperation with a record groove, a metallic coating applied to a vertical face of said beam to provide a first electrode, and a metal plate having one end secured to said head and arranged in spaced and cooperating relation to said coating, to form a variable capacitance therewith.

4. An electrostatic pick-up comprising a pick-up head, an elongated vibratory bar of elastic insulating material having one end secured to said head cantilever fashion and carrying a stylus at its free end for cooperation with a record groove, said stylus forming a substantial angle with the lengthwise dimension of said bar and said bar having a substantially smaller mass than said head, said bar having a cross sectional dimension in the vibrating direction of said stylus progressively increasing from the free end of said bar to its point of connection to said head, a first electrode upon said bar, and a further electrode secured to said head in spaced relation to and cooperating with said first electrode to form a variable capacitance therewith.

5. An electrostatic pick-up comprising a pick-up head, an oblong vibratory bar of elastic insulating material having one end secured to said head cantilever fashion and carrying a stylus at its free end for cooperation with a record groove, said stylus forming a substantial angle with the lengthwise dimension of said bar and said bar having a substantially smaller mass than said head, said bar having a cross sectional dimension in the vibrating direction of said stylus increasing exponentially from the free end of said bar to its point of connection to said head, a first electrode upon said bar, and a further electrode secured to said head in spaced relation to and cooperating with said first electrode to form a variable capacitance therewith.

WILLIAM H. UNGER.

REFERENCES CITED

The following references are of record in the file of this patent:

UNITED STATES PATENTS

| Number | Name | Date |
|---|---|---|
| 1,786,436 | Leffer | Dec. 30, 1930 |
| 1,796,155 | Leffer | Mar. 10, 1931 |
| 2,147,092 | Dudeck | Feb. 14, 1939 |
| 2,319,622 | Mussner | May 18, 1943 |
| 2,371,373 | Badmaieff | Mar. 13, 1945 |
| 2,373,676 | Germeshausen | Apr. 17, 1945 |
| 2,376,456 | Sinnett | May 22, 1945 |
| 2,436,946 | Tatro | Mar. 2, 1948 |

FOREIGN PATENTS

| Number | Country | Date |
|---|---|---|
| 310,762 | Great Britain | Apr. 30, 1929 |